(No Model.)    9 Sheets—Sheet 1.
A. H. LIGHTHALL.
COMBINED HEADER AND THRASHING MACHINE.
No. 266,701.    Patented Oct. 31, 1882.
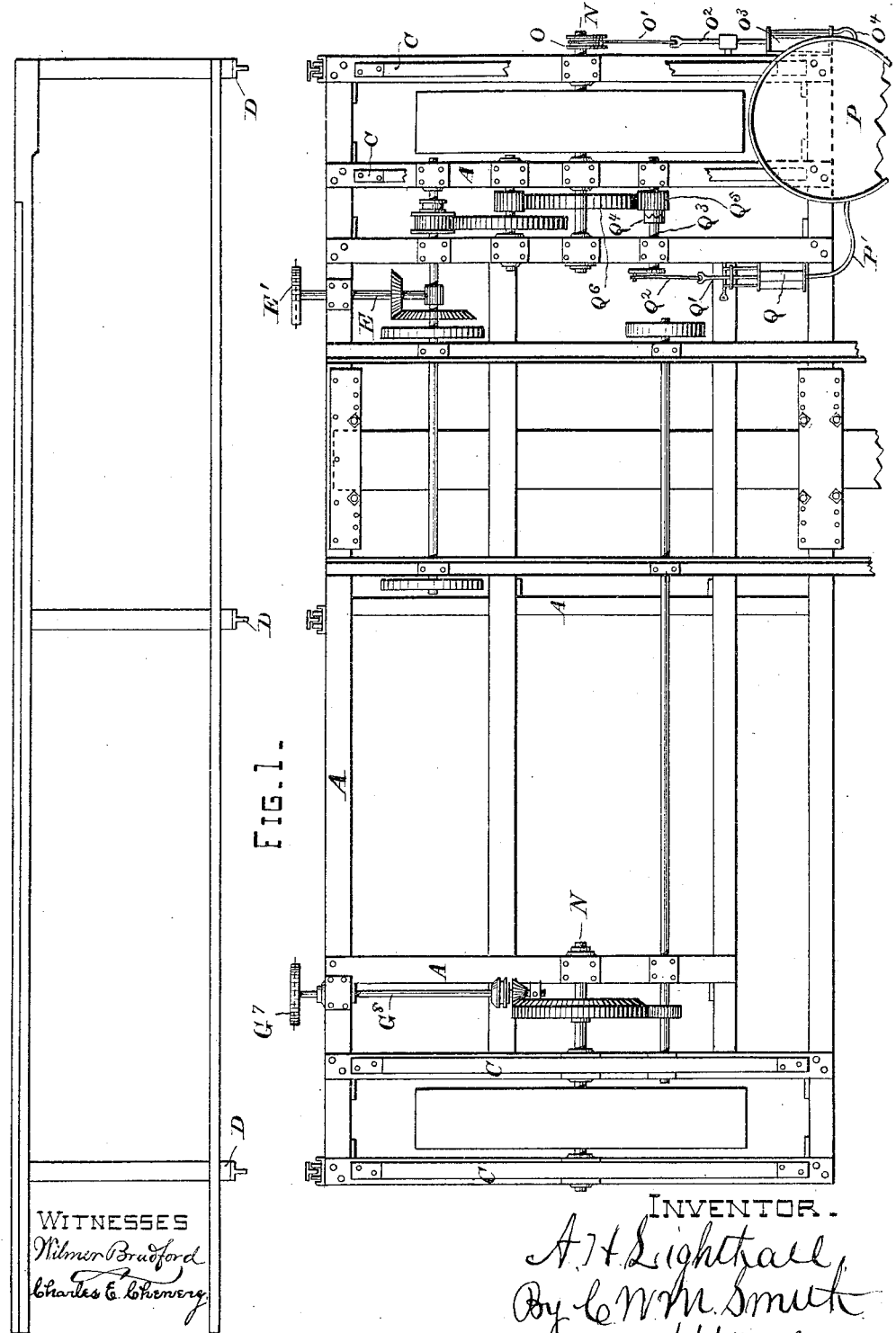
WITNESSES
Wilmer Bradford
Charles E. Cheney
INVENTOR
A. H. Lighthall
By C. W. M. Smith
Attorney.

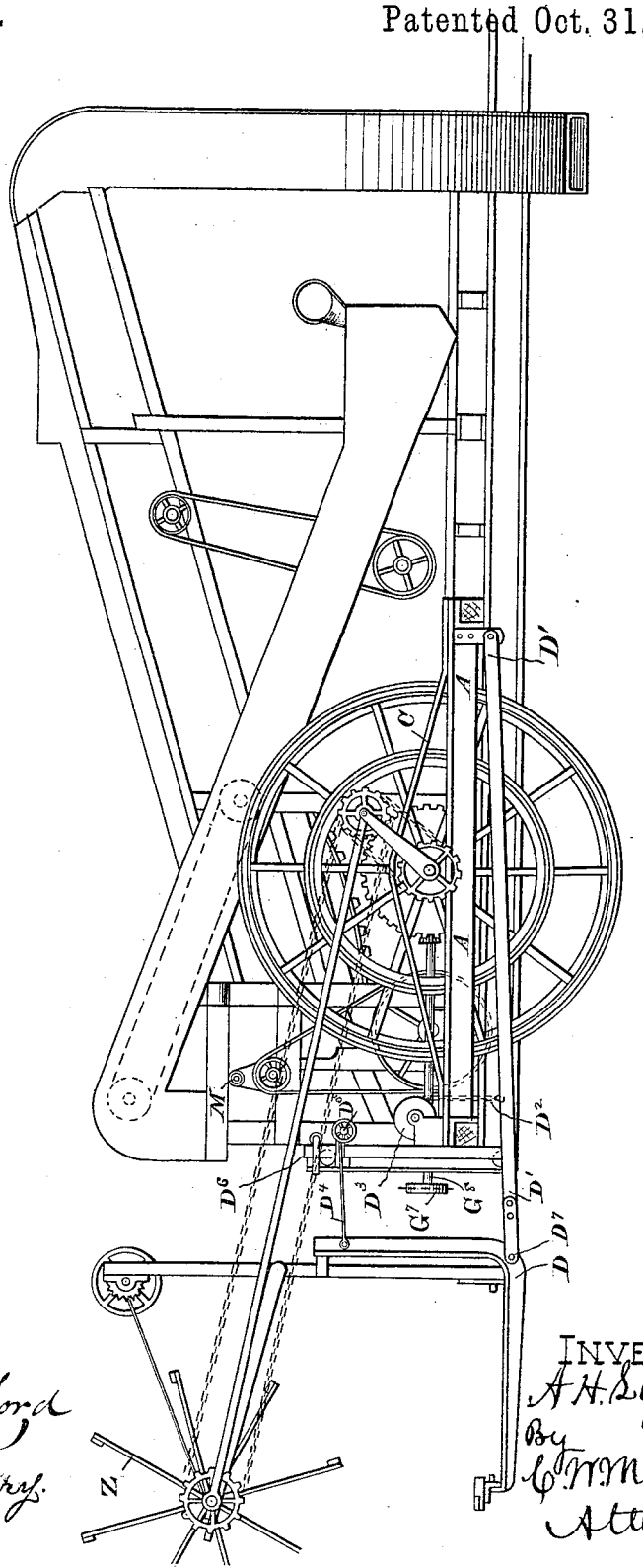

(No Model.)
A. H. LIGHTHALL.
COMBINED HEADER AND THRASHING MACHINE.
No. 266,701. Patented Oct. 31, 1882.
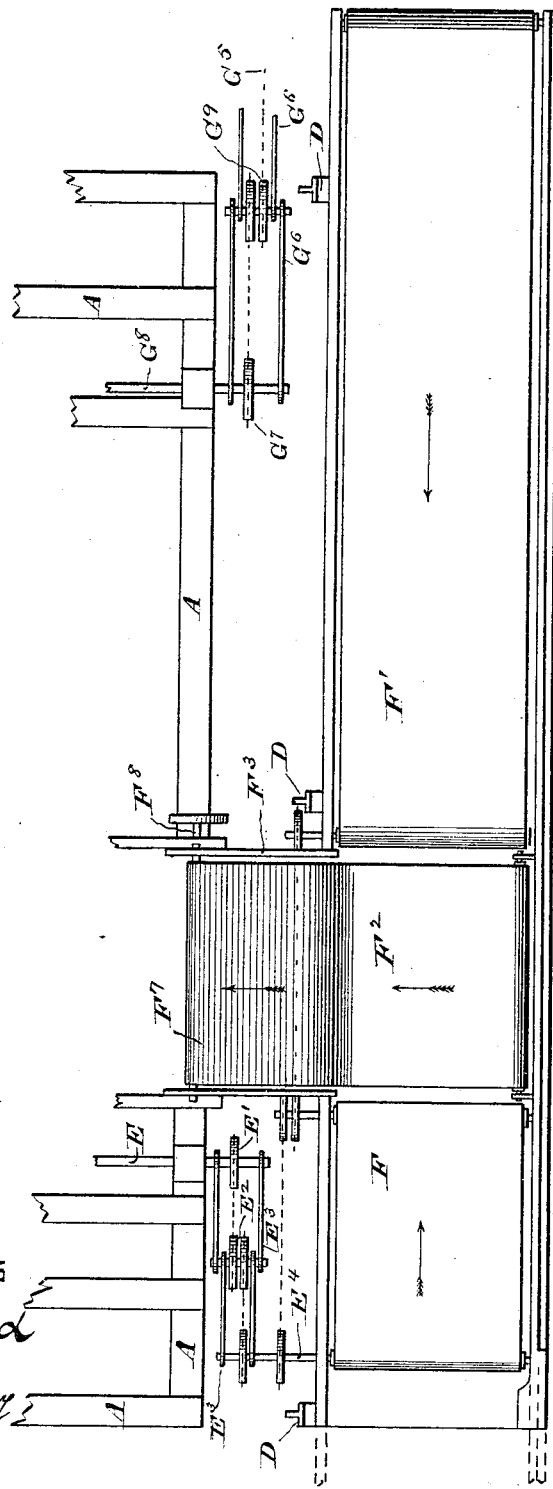

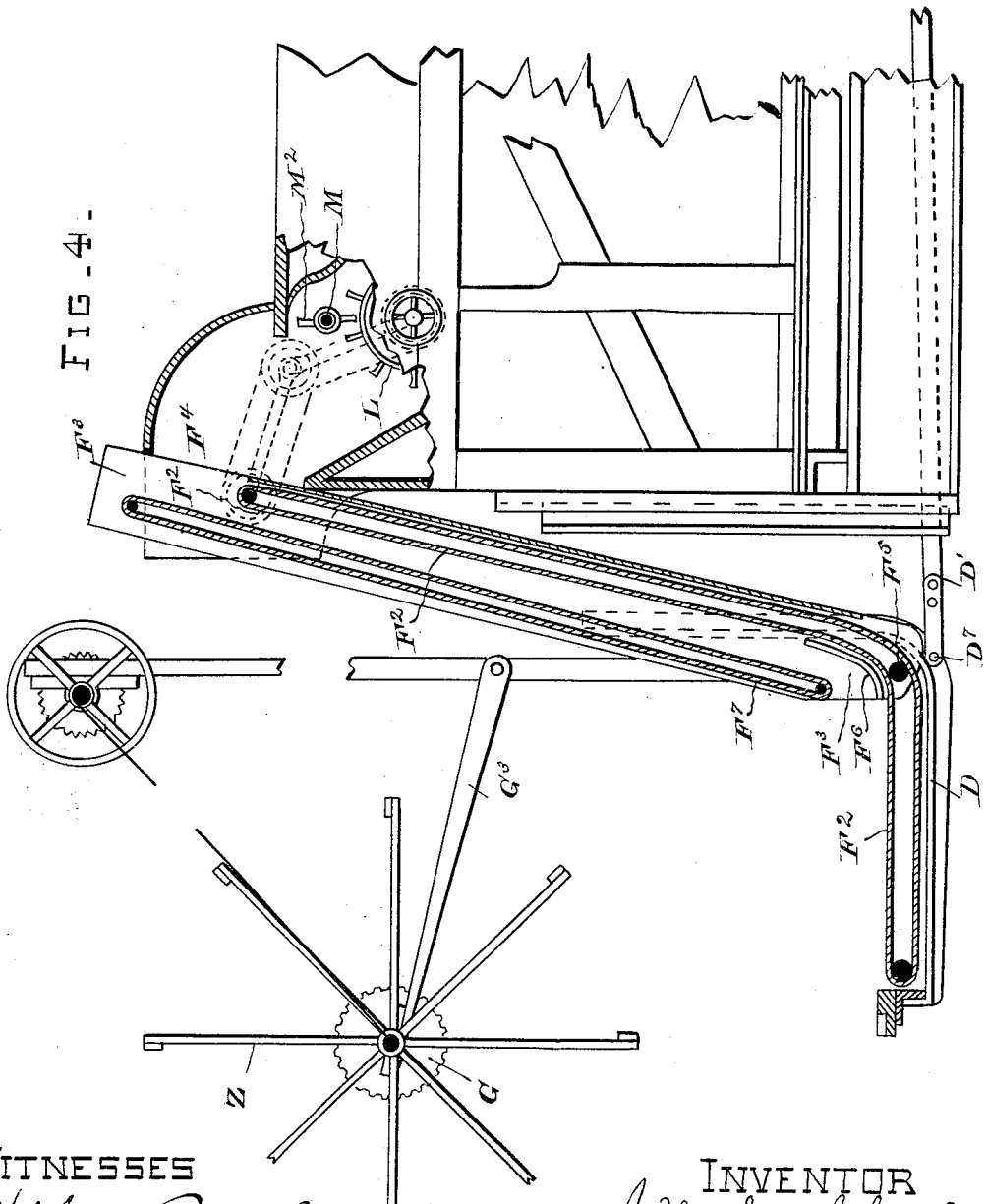

(No Model.) 9 Sheets—Sheet 5.
A. H. LIGHTHALL.
COMBINED HEADER AND THRASHING MACHINE.
No. 266,701. Patented Oct. 31, 1882.
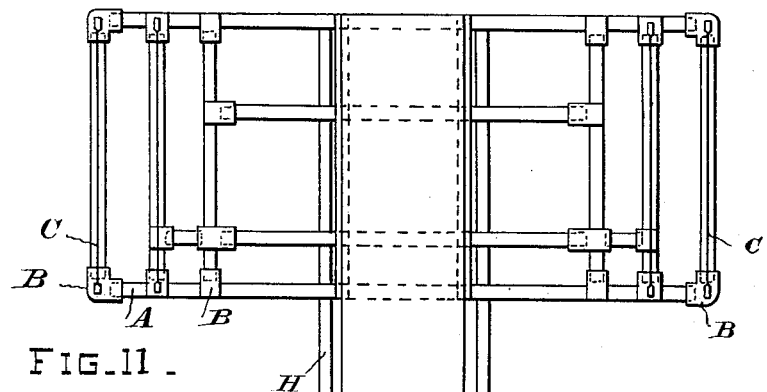
Fig. 11.
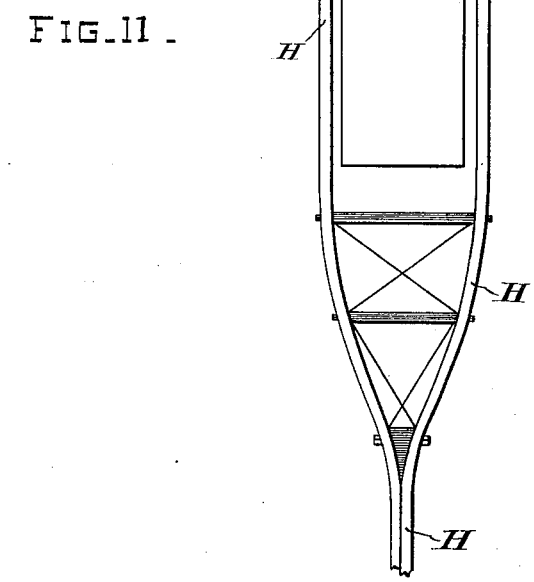
Fig. 5.
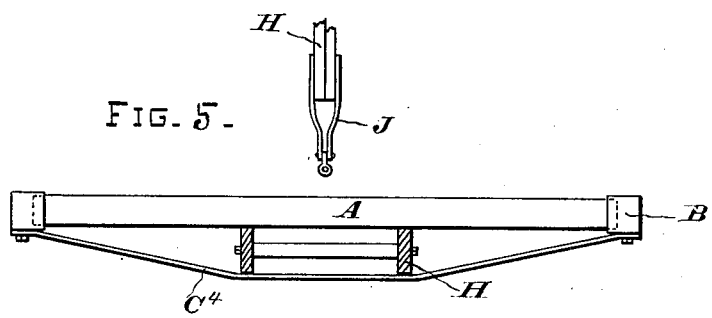
WITNESSES.
Wilmer Bradford
Charles E. Chenery
INVENTOR.
A. H. Lighthall
By C. W. M. Smith
Attorney (No Model.) 9 Sheets—Sheet 6.
A. H. LIGHTHALL.
COMBINED HEADER AND THRASHING MACHINE.
No. 266,701. Patented Oct. 31, 1882.
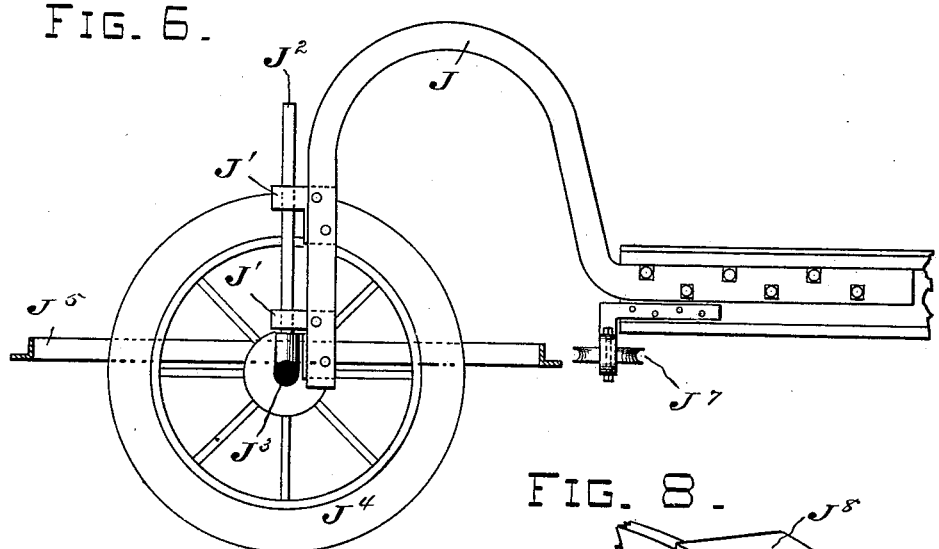
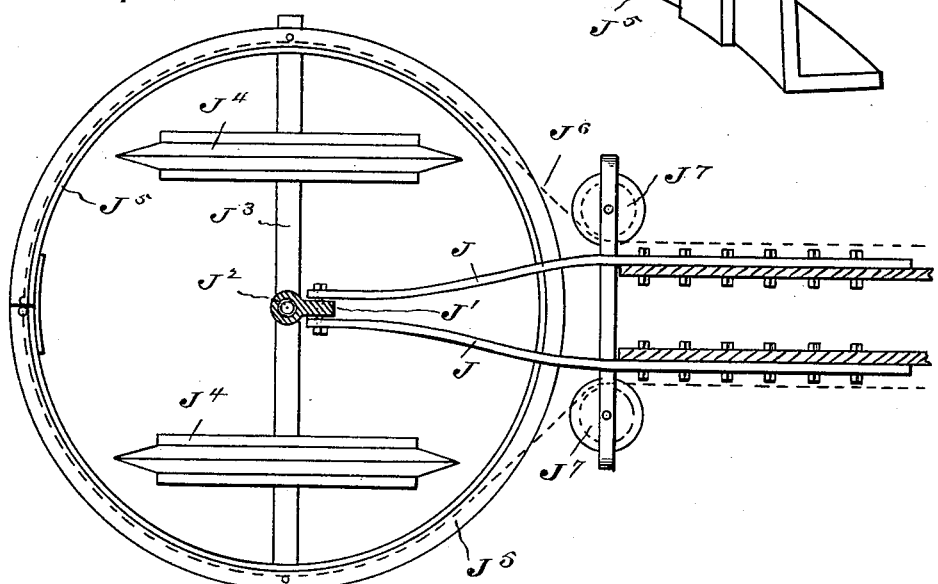
WITNESSES
Wilmer Bradford
Charles E. Chenery
INVENTOR
A. H. Lighthall
By C. W. M. Smith
Attorney (No Model.)  9 Sheets—Sheet 7.
A. H. LIGHTHALL.
COMBINED HEADER AND THRASHING MACHINE.
No. 266,701.  Patented Oct. 31, 1882.
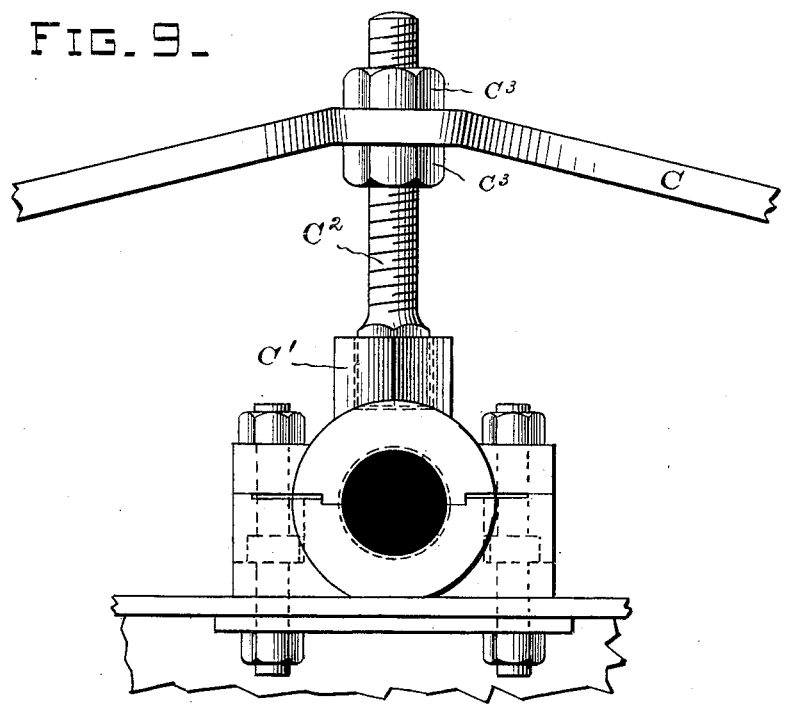
FIG. 9.
FIG. 10.
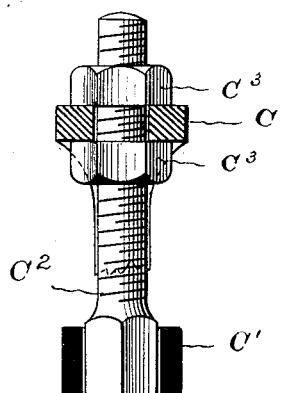
WITNESSES
Wilmer Bradford
Charles E. Chenery.
INVENTOR
A H Lighthall
By C. Wm. Smith
Attorney.

(No Model.)  9 Sheets—Sheet 8.
A. H. LIGHTHALL.
COMBINED HEADER AND THRASHING MACHINE.
No. 266,701.  Patented Oct. 31, 1882.

WITNESSES  
Wilmer Bradford  
Charles D. Cheney

INVENTOR  
A. H. Lighthall  
By C. W. M. Smith  
Attorney (No Model.)

A. H. LIGHTHALL.
COMBINED HEADER AND THRASHING MACHINE.

No. 266,701. Patented Oct. 31, 1882.

9 Sheets—Sheet 9.

WITNESSES.
Wilmer Bradford
Charles E. Chenery

INVENTOR.
A. H. Lighthall
By C. M. Smith Atty.

UNITED STATES PATENT OFFICE.

ALMERIN H. LIGHTHALL, OF SAN FRANCISCO, CALIFORNIA, ASSIGNOR TO WILLIAM B. CARR, OF SAME PLACE.

COMBINED HEADER AND THRASHING-MACHINE.

SPECIFICATION forming part of Letters Patent No. 266,701, dated October 31, 1882.

Application filed December 19, 1881. (No model.)

*To all whom it may concern:*

Be it known that I, ALMERIN HUBBELL LIGHTHALL, a citizen of the United States, and residing at San Francisco, in the county of San Francisco and State of California, have invented a certain new and useful Combined Header and Thrashing-Machine, of which the following is a specification.

My invention relates to improvements in that class of harvesting-machines which are adapted to thrash the grain as it is delivered to the separator by suitable drapers or carrying-aprons directly from the sickle-bar or heading device.

The invention is illustrated in the accompanying drawings, in which—

Figure 12:
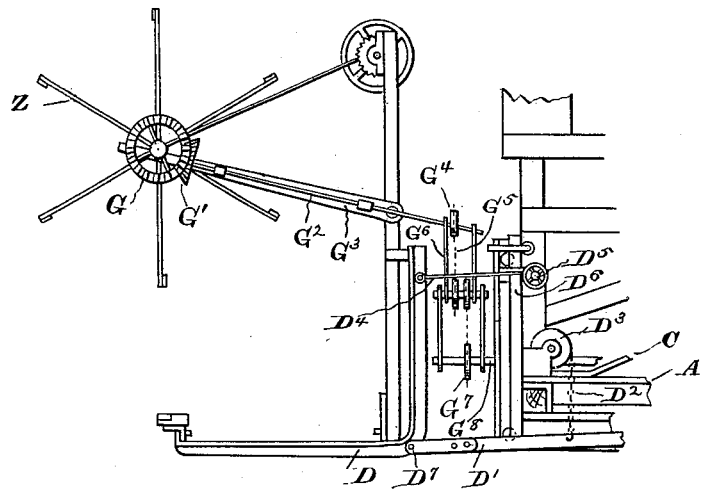
Figure 13:
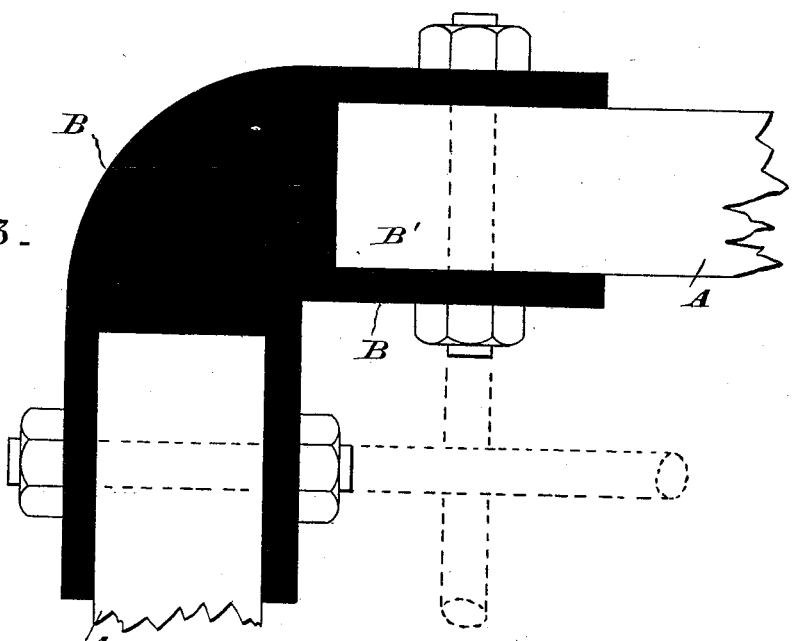
Figure 14:
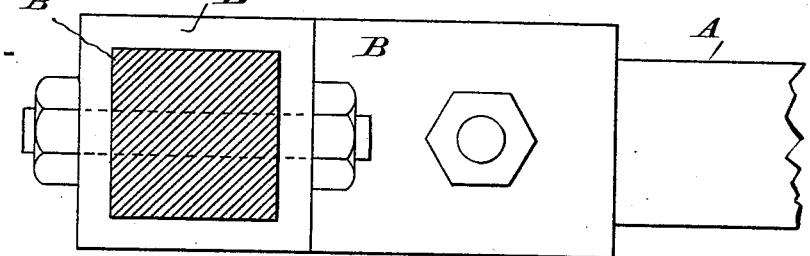
Figure 15:
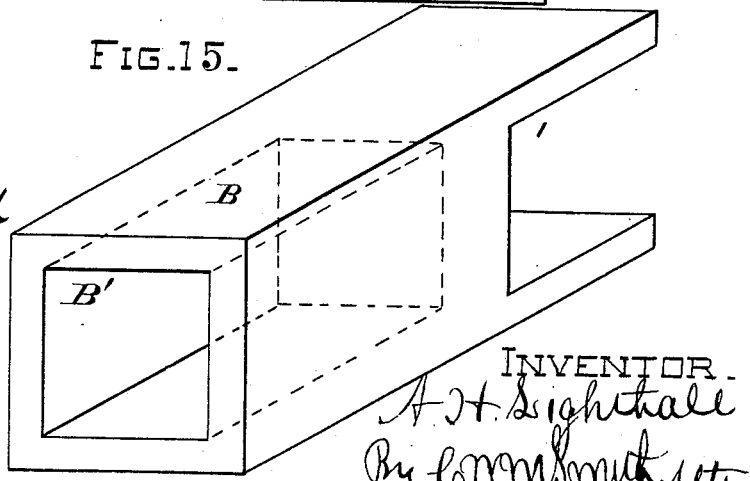

Figure 1 is a general plan of the main or supporting frame-work of my machine. Fig. 2 is a side elevation of the machine, the steering-gear and a portion of the push-beam being omitted. Fig. 3 is a plan view of the drapers and mechanism for driving the same. Fig. 4 is a central vertical section through the transverse draper. Fig. 5 is a side view of main frame, showing the push-beam in cross-section. Fig. 6 is a sectional side elevation of the rudder-wheels and steering mechanism. Fig. 7 is a plan view of the same. Fig. 8 is a detail view, showing in perspective a clip or lug for holding in place the chain or rope upon the rudder-wheel. Fig. 9 is an end view of the journal-box of main driving-wheels, showing manner of applying tension to the truss-rods. Fig. 10 is a sectional view, showing the truss-rod and tension-bolt. Fig. 11 is a plan view, showing the main frame-work constructed of wood timbers and metal joint-boxes, and also the construction and position of the push-beam. Fig. 12 is a side elevation, showing mechanism for driving the reel. Fig. 13 is a sectional plan view of an angle-block for connecting the wooden framing. Fig. 14 is an end view of the same. Fig. 15 is an isometrical view of a joint-block.

Similar letters of reference are used to designate like parts throughout the several views.

The main frame-work A, which supports the working parts of my improved harvesting-machine, may be constructed of metal beams; but I prefer to employ wooden beams or timbers held in position by metal angle-boxes B and joint-boxes B², constructed in the form shown in Figs. 13, 14, and 15, the ends of the timbers being let into the recesses B', by which means a solid bearing and connection for the timbers is had, which obviates any necessity for mortising, tenoning, or scarfing of the timbers, and provides a strong and cheap construction, and also permits of the rapid dismounting and assembling of the frame-work.

The machine is further braced and strengthened by means of truss-rods C and C⁴. For the purpose of applying tension to these rods I form a rectangular recess in a step, C', which receives the square base of the threaded tension-bolt C², which passes through the truss-rod at a point midway of its length, and tension is applied to said truss-rod by turning the set-nuts C³ C³.

The draper-frame D, I prefer to construct of angle-iron bent in the form shown. It is pivoted by the bolt D⁷ to the bar D', which in turn is pivoted to the rear framing-piece of the machine, as is seen in side elevation in Fig. 2. The bar D' may be raised and lowered by means of the chain D², which is wound upon the wheel or drum D³, and by this means the height of the sickle-bar from the ground may be regulated.

Should it become necessary to tilt the draper-frame in order to more conveniently reach very short grain, I slacken upon the cord or chain D⁴, which is connected to the upper part of the vertical portion of the draper-frame and wound upon a reel-rod, D⁵, secured to the upper part of a standard, D⁶, which is bolted to the front frame-piece of the machine. The draper-frame will then move upon its pivotal point D⁷, and the outer edge carrying the sickle-bar will be brought close to the ground. The drapers are to be arranged and driven in the manner illustrated in Figs. 3 and 4.

Upon the shaft E is keyed the sprocket-wheel E', which drives, by means of endless chains and the intermediate sprocket-wheels, E² E², supported by the arms E³ E³, the shaft E⁴ of the draper F, which feeds toward the center of the draper-frame. The draper F' is driven by a crossed-chain connection with the shaft of the draper F and feeds toward the center of the draper-frame.

Near the center of the draper-frame I place the transverse draper $F^2$, which receives the cut grain from the drapers F F' and conveys it up to the throat of the separator. The inclined portion of the draper $F^2$ moves in a chute, $F^3$, pivoted at its lower end to the draper-frame, and the upper portion rests against the edge of the throat leading to the separator, and side movement is prevented by the sides of the hood $F^4$. At that point where the horizontal and perpendicular portions of the draper meet I place the depression-roller $F^5$ and guide-piece $F^6$, which keeps the draper in its proper position.

A swinging draper, $F^7$, is provided, which is pivoted at the upper end upon its driving-shaft, and is driven by a cross-belt from the shaft $F^8$ of the draper $F^2$. The lower end of this pivoted or swinging draper lies closer to or farther away from the feed-draper $F^2$, according to the amount of grain which is being carried upon said feed-draper. The transverse draper is driven by an endless-chain connection, with the shaft of the cylinder and intermediate sprocket-wheels supported by arms, as shown by the dotted lines in Fig. 4.

The reel for the drapers F F' may be driven by an endless-chain connection with the shaft of the main driving-wheels, intermediate sprocket-wheels, and link-arms, as is shown in Fig. 2.

If deemed preferable, the said reel may be driven by the mechanism shown at Fig. 12, in which a miter-wheel, G, is keyed upon the reel-shaft, and meshes into a wheel, G', upon the shaft $G^2$, journaled in suitable bearings upon the pivoted bar $G^3$, supporting said reel Z, and having upon its inner end the sprocket-wheel $G^4$, connected by chain belts $G^5$ and intermediate sprocket-wheels, $G^9$, upon the arms $G^6$, to the sprocket-wheel $G^7$ upon the shaft $G^8$, which latter is driven by intermediate gearing with the shaft of one of the main driving-wheels, as is shown in Fig. 1. The height of the reel may be regulated in any well-known manner, and the sickle-bar is driven by making any suitable connection with the shaft of one of the main driving-wheels.

The push-beam H, I prefer to construct in the manner shown in Figs. 5 and 11, which is formed of two timbers set edgewise under the main frame, to which they are firmly secured by clamp-plates and bolts. These timbers are placed some distance apart, preferably a distance somewhat greater than the width of the thrasher, and form a support for the outer end thereof. After passing the end of the thrasher, the timbers are drawn together and stayed and braced in the manner shown in Fig. 11, and extended backward any suitable distance.

By spreading or forking the push-beam apart at the point where it is connected to the main frame-work I am enabled to stay and support the frame-work in a better manner and distribute the strain more equally upon all parts of the frame, as well as provide a mode of construction which enables me to set the thrasher transversely upon the frame and admit of the passage between the forked beams of the discharging-spout for chaff and straw, which is brought down close to the ground. The timbers of the push-beam are of such a depth as to form a double strut for the lower truss-rods, $C^4$, which extend from end to end of the main frame. Projecting outwardly from the rear end of the push-beam are the two goose-necks J J, which are secured upon either side of the push-beam by bolts. The outer ends or vertical portion of the goose-necks clamp and are bolted to the bearing-blocks J' of a vertical shaft, $J^2$, welded or otherwise secured to the axle $J^3$ of the rudder-wheels $J^4$. The axle $J^3$ is extended beyond the wheels for a sufficient distance to admit of the bolting thereon of a circular band of angle-iron, $J^5$, which is of sufficient diameter to permit the free revolution of the rudder-wheels.

At any convenient point upon the circular band $J^5$, I attach the chain $J^6$, which partially encompasses said band and is led between the friction-rollers $J^7$, which serve to keep it close to the side of the push-beam, and is then led up to the front part of the main frame and wound upon a drum or reel operated by a steering or tiller wheel.

By employing the band $J^5$ and friction-rollers $J^7$ it will be seen that the leverage upon the rudder-wheels will be the same in whatever angle of deflection they may be placed.

In order to hold the steering-chain in place upon the band $J^5$, I provide clips $J^8$, (seen in Fig. 8,) which overlap and are bolted to the inner flange of the angle-iron.

To the outer end of the shaft N of the main driving-wheels I attach the eccentric O, which operates the connecting and piston rods O' $O^2$ of the air-compressor $O^3$, which forces compressed air through a connecting-pipe, $O^4$, into the receiving-tank P, which is connected by a pipe, P', to the air-engine Q, the latter operating by means of suitable piston and connecting rods, Q' $Q^2$, the crank-shaft $Q^3$, provided with a clutch, $Q^4$, and pinion $Q^5$, by which the air-engine Q is thrown out of communication with the gear-wheel $Q^6$ upon the shaft of the driving-wheel when the rotation of said shaft is operating the air-compressor $O^3$ and storing air within the tank P.

When it becomes necessary to operate the thrasher, or to clear the knives of the sickle-bar before or after starting up, or moving the whole machine over the surface of the ground, I admit compressed air to the engine Q, throw the pinion $Q^5$ into gear with the spur-wheel $Q^6$, which is so controlled by a friction-clutch or slip-feather (not shown) as to permit of the free revolution upon the shaft of the driving-wheel, and drive by means of connecting-gears the various operating parts of the machine without being dependent upon the revolution of the traction or main driving wheels, which are intended to furnish the motive power when the whole machine is in full operation.

It is intended that the air-receiver should be kept full at all times, in order that a means may be provided to drive and regulate the speed of the thrashing mechanism independently of the movement of the whole machine.

Having thus described my invention, what I claim, and desire to secure by Letters Patent, is—

1. In a combined header and thrasher, the means for applying tension to the truss-rods thereof, consisting of the threaded bolt $C^2$, having a rectangular base fitting into a correspondingly-shaped recess in a step, $C'$, and having set-nuts $C^3$, by which to regulate the tension of said truss-rods, constructed, arranged, and operating substantially as herein shown and described.

2. In the steering-gear of a combined header and thrasher, the rudder-wheels $J^4$, revolving on the axle $J^3$, vertical shaft $J^2$, boxes $J'$, and gooseneck J, secured to the end of the push-beam, said axle $J^3$ having attached to its outer ends the circular band $J^5$, around which the steering-chain $J^6$ passes and is connected at a point equidistant from the rudder-wheels, constructed and arranged to operate substantially in the manner as herein set forth.

3. The combination of the lateral inwardly-inclined drapers F F', the transverse draper $F^2$, the swinging draper $F^7$, chute $F^3$, hood $F^4$, roller $F^5$, and guide $F^6$, all constructed and arranged as and for the purpose described.

4. The combination of the draper-frame D, the lever-bar D', pivoted to said frame and to the rear framing of the machine, the drum $D^3$, chain $D^2$, connecting said drum and lever-bar, the reel-rod $D^5$, and the cord or chain $D^4$, connecting the same with the vertical portion of the draper-frame, whereby said frame may be raised or tilted, as and for the purpose described.

In testimony that I claim the foregoing I have hereunto set my hand and seal this 8th day of December, 1881.

ALMERIN H. LIGHTHALL. [L. S.]

Witnesses:
 C. W. M. SMITH,
 CHAS. E. KELLY.